(12) United States Patent
Diamond et al.

(10) Patent No.: US 11,058,526 B2
(45) Date of Patent: Jul. 13, 2021

(54) HANDHELD DEVICE DRIVE SYSTEM

(71) Applicant: GlaxoSmithKline Consumer Healthcare (UK) IP Limited, Middlesex (GB)

(72) Inventors: David Diamond, Middlesex (GB); Jean Diamond, Middlesex (GB)

(73) Assignee: GlaxoSmithKline Consumer Healthcare (UK) IP Limited;, Brentford (GB)

( * ) Notice: Subject to any disclaimer, the term of this patent is extended or adjusted under 35 U.S.C. 154(b) by 0 days.

(21) Appl. No.: 16/477,652

(22) PCT Filed: Jan. 17, 2018

(86) PCT No.: PCT/EP2018/051068
§ 371 (c)(1),
(2) Date: Jul. 12, 2019

(87) PCT Pub. No.: WO2018/134225
PCT Pub. Date: Jul. 26, 2018

(65) Prior Publication Data
US 2019/0357664 A1    Nov. 28, 2019

(30) Foreign Application Priority Data

Jan. 19, 2017   (IE) .................................. 2017/0021

(51) Int. Cl.
*F16H 3/42*    (2006.01)
*A61C 17/26*   (2006.01)
(Continued)

(52) U.S. Cl.
CPC .............. *A61C 17/26* (2013.01); *A46B 9/028* (2013.01); *A46B 13/02* (2013.01); *F16H 1/20* (2013.01); *F16H 1/24* (2013.01); *F16H 3/366* (2013.01); *F16H 3/426* (2013.01); *F16H 35/10* (2013.01); *F16H 55/10* (2013.01); *A46B 2200/1066* (2013.01)

(58) Field of Classification Search
CPC ....... A46B 9/028; A46B 13/02; A46B 13/001; A46B 13/008; F16H 35/10; F16H 1/24; F16H 55/10; F16H 1/20; F16H 3/426; F16H 3/366; A61C 17/26; A61C 17/32; A61C 17/24
USPC ...... 74/415, 351; 15/28, 22.1, 23, 22.2, 22.4
See application file for complete search history.

(56) References Cited

U.S. PATENT DOCUMENTS 2,805,529 A   9/1957  Mathes
2,861,462 A   11/1958 Hussar
(Continued)

FOREIGN PATENT DOCUMENTS

CN    208114669 U  * 11/2018
DE    33 42 374 A1   4/1984
(Continued)

*Primary Examiner* — Mark Spisich
*Assistant Examiner* — Katina N. Henson
(74) *Attorney, Agent, or Firm* — Roshni A. Sitapara

(57) ABSTRACT

This invention relates to a drive system which automatically disengages when a loading above a certain threshold limit is applied to the driven component, thus preventing damage to the drive system and foremost to the gearing between the drive system and the driven component when such a load is applied.

14 Claims, 2 Drawing Sheets

(51) Int. Cl.
  *A46B 13/02* (2006.01)
  *A46B 9/02* (2006.01)
  *F16H 1/24* (2006.01)
  *F16H 35/10* (2006.01)
  *F16H 55/10* (2006.01)
  *F16H 1/20* (2006.01)
  *F16H 3/36* (2006.01)

(56) References Cited

U.S. PATENT DOCUMENTS

| | | | | |
|---|---|---|---|---|
| 5,214,819 | A * | 6/1993 | Kirchner | A61C 17/26 |
| | | | | 15/22.1 |
| 8,516,641 | B2 * | 8/2013 | Diamond | A61C 17/3472 |
| | | | | 15/22.1 |
| 2010/0330538 | A1 * | 12/2010 | Salazar | A61C 17/3445 |
| | | | | 433/216 |
| 2013/0255014 | A1 * | 10/2013 | Kloster | A61C 17/222 |
| | | | | 15/22.1 |

FOREIGN PATENT DOCUMENTS

| | | | |
|---|---|---|---|
| EP | 2142138 | B1 | 4/2016 |
| JP | 2015 164531 | A | 9/2015 |

* cited by examiner

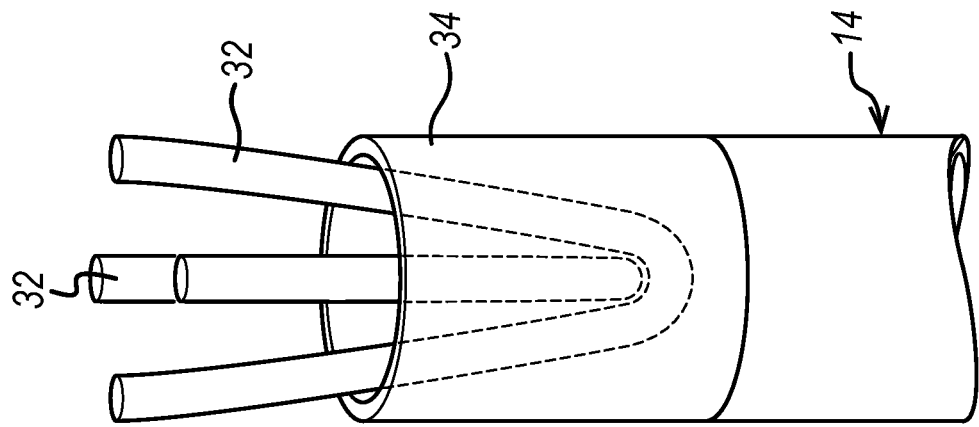
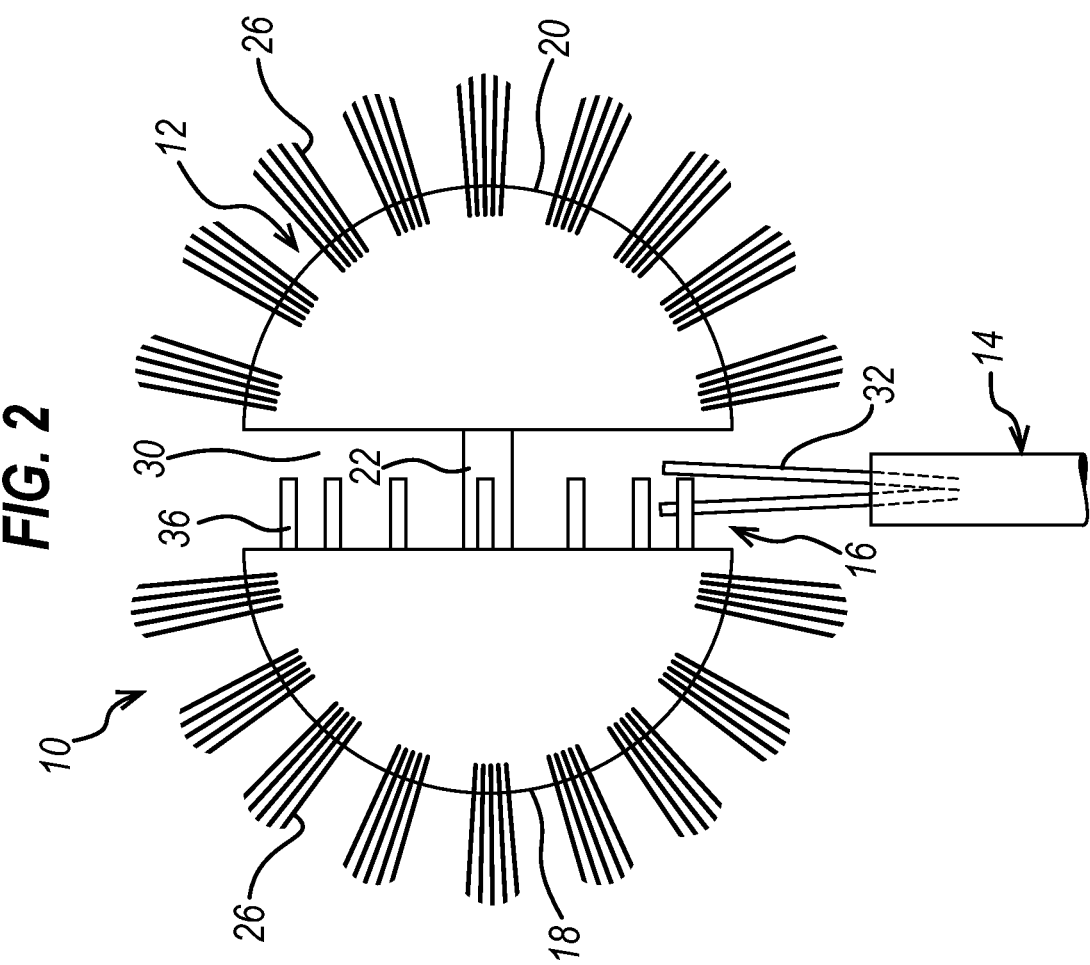

HANDHELD DEVICE DRIVE SYSTEM

This application is a 371 of International Application No. PCT/EP2018/051068, filed Jan. 17, 2018, which claims the priority of IE Application No. S2017/0021, filed Jan. 19, 2017 which is incorporated herein in its entirety.

FIELD OF INVENTION

This invention relates to a drive system for a handheld device such as an electric toothbrush, screwdriver, polisher, etc., and in particular a drive system which automatically disengages when a loading above a certain threshold limit is applied to a rotatable head of the drive system, thus preventing damage to the drive system and foremost to the gearing between the drive system and the head when such a load is applied.

BACKGROUND OF INVENTION

Handheld drive systems are used in a variety of small electrical appliance devices such as toothbrushes, screwdrivers, polishers, grinders etc. Handheld drive systems may induce movement of components of the head in more than one direction, whether simultaneously or independently (as outlined in patent EP2142138B1), and they may also produce reversible movement (clockwise and anticlockwise movement).

Due to the handheld nature of the drive system, the components within the system tend to be as small as possible and as light as possible. Items such as teeth on cogs or gears within the system can therefore be expected to be extremely small and therefore of limited strength. The capacity of the motor will also be chosen to suit the intended use of the handheld drive system, for instance a handheld drive system suitable for a toothbrush may be less powerful than a handheld drive system suitable for a screwdriver.

If the drive transmission between the shaft and the head continues despite an impediment to the motion of the head (such as teeth clamping down on a toothbrush or over tightening of a screw), it may cause damage to the individual components within the handheld drive system (such as the teeth on the cogs etc.). As the handheld drive system is usually a substantially enclosed system, replacement of small parts may not be practical and a broken interior component may signal the end of the life of the entire device. The prolonged transmission of drive despite an impediment may also cause damage to the motor which powers the handheld drive system.

It is therefore an object of the present invention to provide a solution which enables the automatic disengagement of the transmission of the drive to the head in order to avoid damage to the drive system components when an impediment to the motion of the head results in a threshold torque being exceeded.

SUMMARY OF INVENTION

According to a first aspect of the present invention there is provided a handheld device drive system comprising a rotatable head; a drive shaft; and a coupling operable to transmit drive from the drive shaft to the head, the coupling being adapted to automatically disengage the transmission of drive between the shaft and the head when a threshold torque on the head is exceeded.

Preferably, the coupling comprises a gear set having at least one driving tooth in operative association with the drive shaft and cooperating driven teeth in operative association with the head, the at least one driving tooth being resiliently deformable in order to facilitate the disengagement of drive transmission.

Preferably, the head comprises opposed halves joined by a central axle, the driven teeth being provided on one half of the head.

Preferably, each half comprises an end face, the pair of end faces in spaced opposition from one another such as to define a channel between the halves, the driven teeth being provided on the end face of one of the halves.

Preferably, the gear set comprises pegged gears.

Preferably, the at least one driving tooth comprises a resiliently deformable finger.

Preferably, the at least one driving tooth comprises an opposed pair of resiliently deformable fingers.

Preferably, the pair of fingers are formed from a single length of material folded such that a pair of free ends are located adjacent one another.

Preferably, the or each finger comprises a metal wire.

Preferably, the wire has a diameter of less than 1 mm, preferably less than 0.7 mm, and most preferably 0.5 mm.

Preferably, the at least one driving tooth comprises two pairs of opposed resiliently deformable fingers, the two pairs being offset.

Preferably, the driven teeth comprise pegs projecting from the end face of one of the halves of the head.

Preferably, the drive shaft comprises a hollow end adjacent the head from which hollow end the at least one driving tooth projects.

Preferably, the drive shaft has a diameter of less than 5 mm, preferably less than 4 mm, and most preferably less than 2.5 mm.

Preferably, the head is substantially spherical.

Preferably, the head comprises an array of bristles extending outwardly therefrom.

According to a second aspect of the present invention there is provided an electric toothbrush comprising the drive system of any preceding claim.

BRIEF DESCRIPTION OF DRAWINGS

The present invention will now be described with reference to the accompanying drawings, in which:

FIG. 2 illustrate an end elevation of the handheld device drive system as illustrated in FIG. 1, and;

FIG. 3 illustrates an enlarged view of a free end of a drive shaft forming part of the handheld device drive system illustrated in FIGS. 1 and 2.

DETAILED DESCRIPTION OF DRAWINGS

Figure 1:
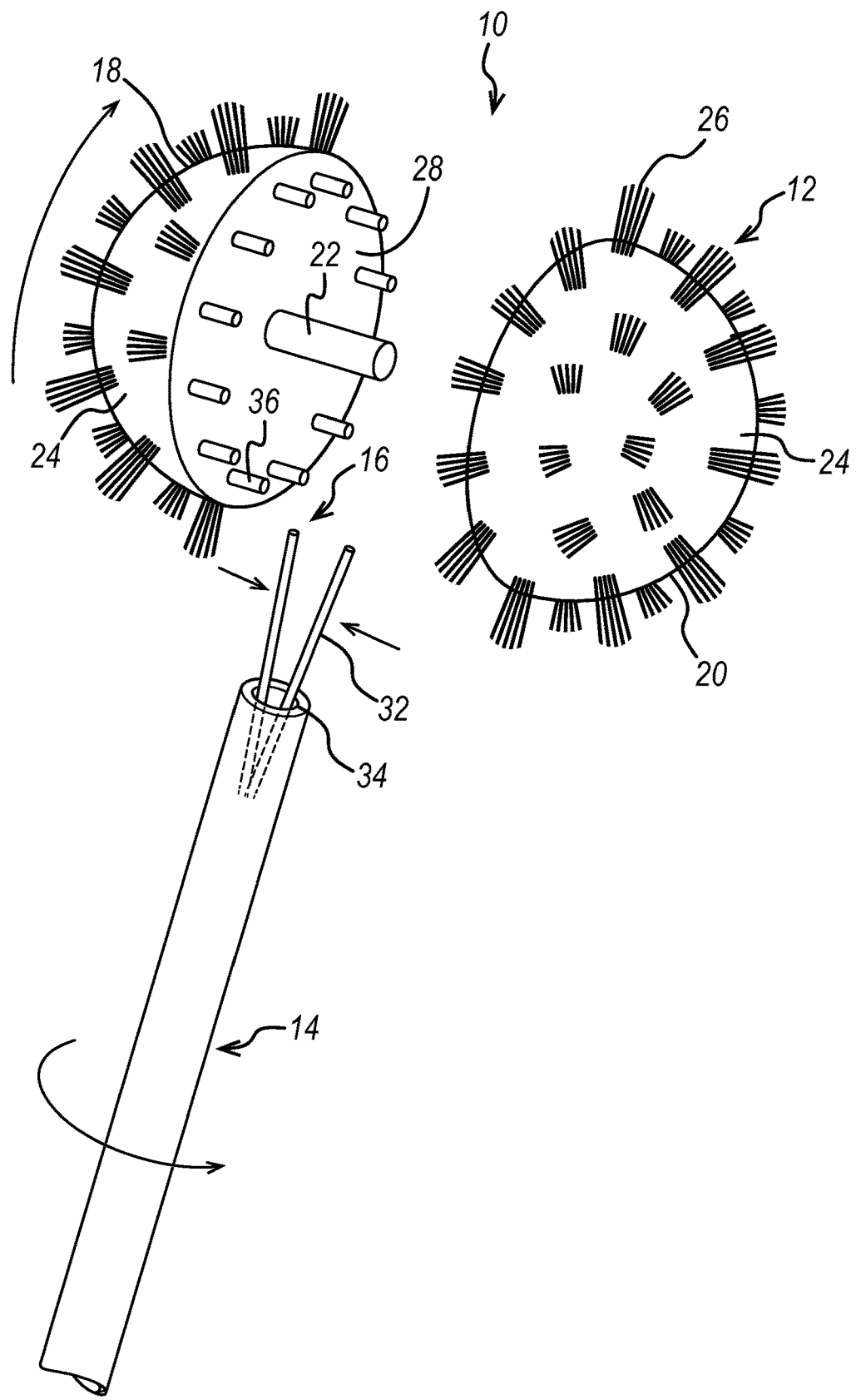
FIG. 1 illustrates a schematic representation of a handheld device drive system according to an embodiment of the present invention.

Referring now to the accompanying drawings there is illustrated a handheld device drive system, generally indicated as 10, to be incorporated, in a particularly preferred embodiment, into an electric toothbrush (not shown), although it will be appreciated from the following description that the drive system 10 could be utilised in other mechanised tools in which various drive modes may be imparted though one or more drive shafts or the like.

In the embodiment illustrated the drive system 10 comprises a head 12 which is substantially spherical in shape but which may be of any other suitable form, and which is mounted adjacent the free end of a drive shaft 14 which is operable to effect rotation of the head 12 through the action of a coupling 16 which transmits drive from the drive shaft 14 to the head 12 as hereinafter described.

In use the electric toothbrush or other mechanised tool will preferably be provided with an electric motor (not shown) arranged to effect the high speed rotation of the drive shaft 14 in order to effect rotation of the head 12, the electric motor being in operative association with an opposed end of the drive shaft 14. It will however be appreciated that any other suitable drive source may be utilised in place of an electric motor. The electric toothbrush (not shown) or other handheld tool or device will preferably include a handle portion in which the electric motor and requisite battery (not shown) are located, along with any necessary sensors, control circuitry, etc.

In the embodiment illustrated the head 12 comprises a pair of hemispheres, a first hemisphere 18 and a second hemisphere 20 which are secured to one another by means of centrally extending axle 22 which in the embodiment illustrated also defines an axis of rotation for the head 12. Each of the hemispheres 18, 20 comprise a curved outer surface 24 which, when the drive system 10 is to be incorporated into an electric toothbrush, will be provided with an array of bristles 26 thereon, the hemispheres 18, 20 further comprising a planar end face 28 which in use are arranged in opposed spaced relationship to one another such as to define a channel 30 between the hemispheres 18, 20. In use this channel 30 may be closed to the exterior by means of a circumferentially-extending ring (not shown) which may be secured to a hollow shaft (not shown) located concentrically about the drive shaft 14, which ring may also serve as a bearing for the hemispheres 18, 20 and optionally a means of rotating the head 12 about a second axis of rotation substantially coaxial with a longitudinal axis of the drive shaft 14.

The coupling 16 for transmitting drive from the drive shaft 14 to the head 12 comprises a gear set including driving teeth 32 which extend from a hollow end 34 of the drive shaft 14, and corresponding driven teeth 36 which project from the end face 28 of the first hemisphere 18 only of the head 12. The driven teeth 36 are peg or pin-like cylindrical rods each forming a cantilever projection from the end face 28, while the driving teeth 32 are slender fingers which are oriented orthogonally with respect to the driven teeth 36 and are positioned to mesh with the driven teeth 36 adjacent the hollow end 34 of the drive shaft 14. This arrangement is commonly referred to as a set of pegged gears. While a single driving tooth could be provided, it is preferably that the drive system 10 comprises at least one pair of driving teeth 32, as shown in FIGS. 1 and 2, although two such pairs, offset at 90 degrees, is also envisaged and illustrated in FIG. 3. Each opposed pair of driving teeth 32 are preferably formed from a single length of material such as a resiliently deformable wire or the like, folded approximately in half such that the opposed free ends form the pair of driving teeth 32, while the folded end of the length of wire is inserted into and suitably secured within the hollow end 34 of the drive shaft 14. The driving teeth 32 are arranged to be resiliently deformable, through a combination of dimension and material selection, and are adapted to deform radially inwardly towards one another upon the application of a suitable threshold force thereto. Once the force has been removed the resiliently deformable driving teeth 32 return to their original configuration spaced from one another.

Thus, in use the drive shaft 14 is rotated about a longitudinal axis thereof, for example by means of an electric motor as hereinbefore described, thereby effecting rotation of the driving teeth 32 within the channel 30. As the driving teeth 32 mesh with the driven teeth 36 this will result in rotation of the head 12 about the axis of rotation defined by the axle 22. The number of driving teeth 32 and driven teeth 36 may be selected to provide a suitable speed of rotation for the head 12. If, however, an external retarding force is applied to the head 12, for example were a user to clamp their teeth down on the head 12 or grip the head 12 between the user's fingers, the drive system 10 is designed to disengage the transmission of drive from the drive shaft 14 to the head 12 in order to prevent damage to the small working components of the drive system 10, in particular the driving teeth 32 and the driven teeth 36.

Thus, when such a threshold torque on the head 12 is exceeded the resiliently deformable driving teeth 32, while bearing against the meshing driven teeth 36, will deform inwardly in order to allow the driving teeth 32 to slip past the stationary driven teeth 36 such that the drive shaft 14 can continue to rotate despite the immobilisation of the head 12, thus avoiding damage to these components. This functionality facilitates the utilisation of components of significantly reduced dimensions, which must be of a suitably small size for use within a handheld electric toothbrush or the like. For example, this allows the drive shaft 14 to be in the region of less than 5 mm in diameter, and preferably less than 2.5 mm in diameter. In the preferred embodiment illustrated the driving teeth 32 are formed from steel wire which is 0.5 mm in diameter, although it will be appreciated that the size, shape and material chosen for both the driving teeth 32 and the driven teeth 36 may be varied as required, in particular to tune the threshold torque at which the driving teeth 32 will deform to disengage the transmission of drive between the drive shaft 14 and the head 12. It will also be appreciated that the driven teeth 36 could be formed from a resiliently deformable material along with or in substitution of the driving teeth 32.

It will therefore be appreciated that the drive system 10 of the present invention provides a means of transmitting drive from a small diameter drive shaft to a brush head or the like whose design prevents damage to the small and relatively delicate gears in the event that an external impediment to the rotation of the head is experienced.

The invention claimed is:

1. A handheld device drive system comprising a rotatable head; a drive shaft; and a coupling operable to transmit drive from the drive shaft to the rotatable head, the coupling being adapted to automatically disengage the transmission of drive between the shaft and the rotatable head when a threshold torque on the rotatable head is exceeded,
    wherein the coupling comprises a gear set having at least one driving tooth in operative association with the drive shaft and cooperating driven teeth in operative association with the rotatable head, the at least one driving tooth being resiliently deformable in order to facilitate the disengagement of drive transmission,
    wherein the at least one driving tooth comprises at least one resiliently deformable finger, and
    wherein the at least one resiliently deformable finger comprises a metal wire.

2. The drive system of claim 1 wherein the rotatable head comprises opposed halves joined by a central axle, the driven teeth being provided on one half of the opposed halves of the rotatable head.

3. The drive system of claim 2 in which each half of the opposed halves comprises an end face, the pair of end faces spaced opposed from one another such as to define a channel between the opposed halves, the driven teeth being provided on the end face of one of the halves.

4. The drive system of claim 3 wherein the driven teeth comprise pegs projecting from the end face of one of the opposed halves of the rotatable head.

5. The drive system according to claim 1 in which the gear set comprises pegged gears.

6. The drive system of claim 1 wherein the at least one resiliently deformable finger comprises at least one opposed pair of resiliently deformable fingers.

7. The drive system of claim 6 wherein the opposed pair of resiliently deformable fingers are formed from a single length of material folded such that a pair of free ends are located adjacent one another.

8. The drive system of claim 6 wherein the at least one opposed pair of resiliently deformable fingers comprises two pairs of opposed resiliently deformable fingers.

9. The drive system of claim 1 in which the wire has a diameter of less than 1 mm.

10. The drive system of claim 1 in which the drive shaft comprises a hollow end adjacent the rotatable head from which hollow end the at least one driving tooth projects.

11. The drive system of claim 10 in which the drive shaft has a diameter of less than 5 mm.

12. The drive system of claim 1 in which the rotatable head is substantially spherical.

13. The drive system of claim 1 wherein the rotatable head comprises an array of bristles extending outwardly therefrom.

14. An electric toothbrush comprising the drive system of claim 1.

* * * * *